US010150236B2

(12) United States Patent
Weckerle

(10) Patent No.: US 10,150,236 B2
(45) Date of Patent: Dec. 11, 2018

(54) METHOD OF POSITIONING AND HOLDING AN AIR PERMEABLE MEDIA WITHIN A MOLD PRIOR TO CLOSURE AND THROUGH ENCAPSULATION, AND AN OVERMOLDED HCA TRAP PRODUCED BY THE METHOD

(71) Applicant: MANN+HUMMEL GMBH, Ludwigsburg (DE)

(72) Inventor: Rick Weckerle, Kalamazoo, MI (US)

(73) Assignee: MANN+HUMMEL GmbH, Ludwigsburg (DE)

( * ) Notice: Subject to any disclaimer, the term of this patent is extended or adjusted under 35 U.S.C. 154(b) by 388 days.

(21) Appl. No.: 14/929,563

(22) Filed: Nov. 2, 2015

(65) Prior Publication Data
US 2016/0121528 A1 May 5, 2016

Related U.S. Application Data

(60) Provisional application No. 62/073,985, filed on Nov. 1, 2014.

(51) Int. Cl.
*B29C 45/56* (2006.01)
*B29C 45/14* (2006.01)
*B29L 31/14* (2006.01)

(52) U.S. Cl.
CPC .. *B29C 45/14065* (2013.01); *B29C 45/14336* (2013.01); *B29C 45/14786* (2013.01); *B29C 45/56* (2013.01); *B29C 45/14811* (2013.01); *B29C 2045/14163* (2013.01); *B29L 2031/14* (2013.01)

(58) Field of Classification Search
CPC ...... B29C 2045/14147; B29C 2045/14; B29C 45/14; B29C 45/14336
See application file for complete search history.

(56) References Cited

U.S. PATENT DOCUMENTS

| | | | |
|---|---|---|---|
| 2005/0166317 A1* | 8/2005 | Kelly | A47C 7/282 5/110 |
| 2011/0023719 A1* | 2/2011 | Kidman | B01D 53/0407 96/136 |
| 2013/0052412 A1* | 2/2013 | Fox | B29C 43/02 428/139 |
| 2013/0276633 A1 | 10/2013 | Berisha et al. | |

* cited by examiner

*Primary Examiner* — Monica A Huson
*Assistant Examiner* — Kelsey C Grace
(74) *Attorney, Agent, or Firm* — James Hasselbeck

(57) ABSTRACT

Disclosed is a method of locating and holding one or more sheets of air permeable media within an injection mold tool and holding the location until the mold tool engaged and holds media sheets, as well as molding a support frames encapsulating the media sheets to form a unitary encapsulated filtration product.

7 Claims, 7 Drawing Sheets

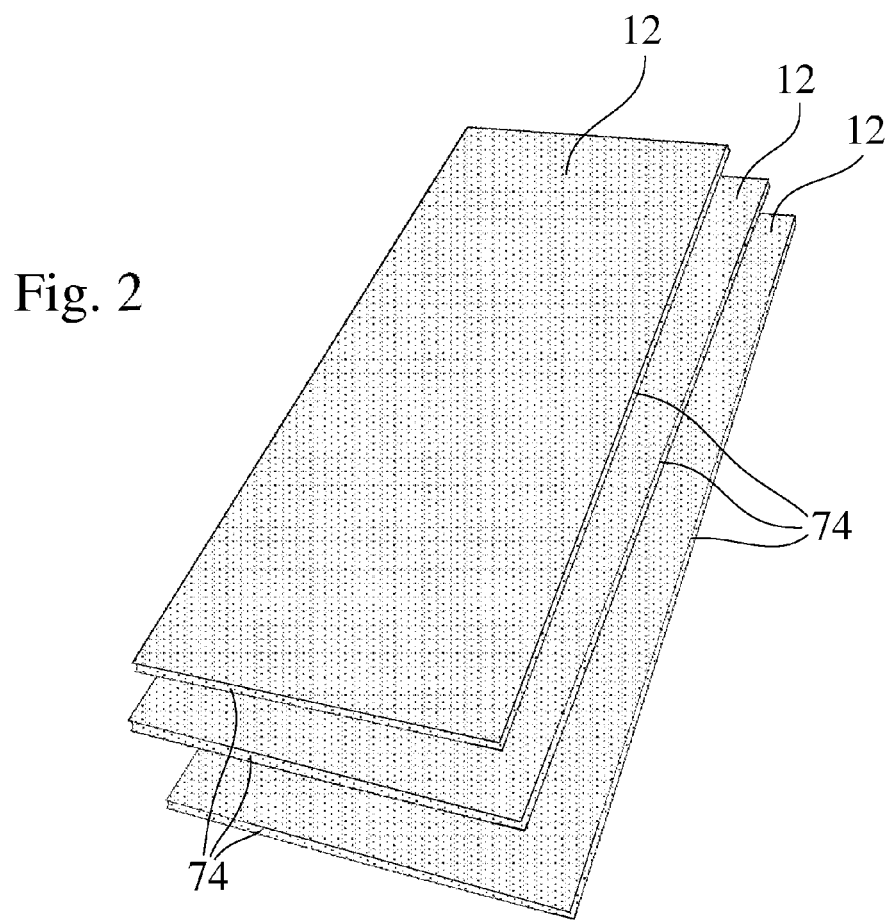
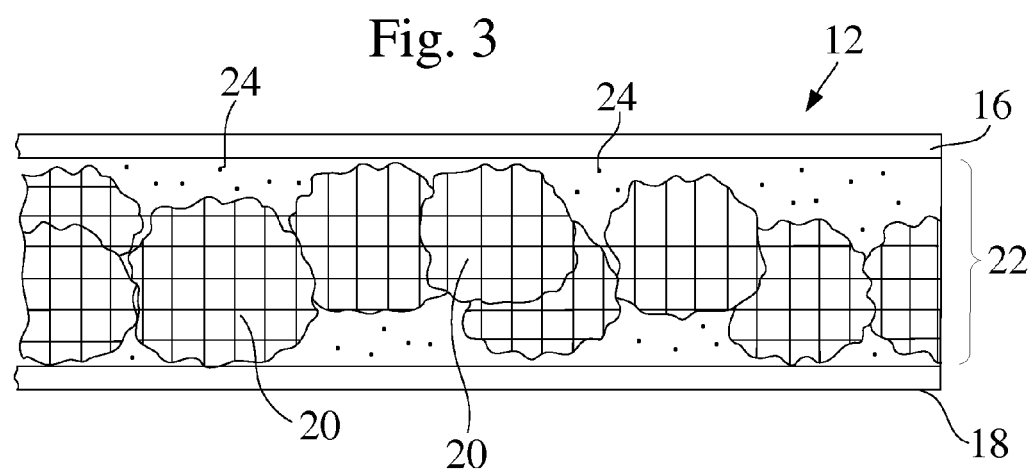

METHOD OF POSITIONING AND HOLDING AN AIR PERMEABLE MEDIA WITHIN A MOLD PRIOR TO CLOSURE AND THROUGH ENCAPSULATION, AND AN OVERMOLDED HCA TRAP PRODUCED BY THE METHOD

CROSS-REFERENCE TO RELATED APPLICATION

This application claims the benefit of U.S. Provisional Application No. 62/073,985, filed Nov. 1, 2014.

TECHNICAL FIELD

The invention relates to a method of positioning and holding one or more stacked sheets of air permeable media or filtration media within a molding tool prior, continuing to hold the media in place during encapsulation with a plastic resin, thereby reliably positioning and encapsulating the media in an efficient means into a molded frame formed directly onto the media, forming a unitary encapsulated product. Also disclosed is a hydrocarbon adsorption trap manufactured by this method.

BACKGROUND OF THE INVENTION

In the art it is known to provide a frame to mount a filter media in a housing and to support the filter media. It is also known to produce a filtration device by separately producing a frame member configured to receive the media and then gluing filter media into the frame member to form the intended filter element or device product.

It is known to produce air permeable media sheets have open pores sized to capture or restrict the passage of particle or contaminants for filtering fluids or as well as using air permeable sheets to enclose hydrocarbon adsorption media having hydrocarbon adsorption properties.

Regarding hydrocarbon adsorption media and HCA traps, it is desirable to trap evaporated fuel and oil vapors within the air intake system, thereby preventing their release into the outside environment. Fuel vapors contain hydrocarbons which are known to be a significant contributing component in urban smog.

Gasoline, for example, is a highly volatile hydrocarbon fuel that includes components which transition easily from a liquid to vapor phase. Elevated temperatures such as occurring during normal internal combustion engine operation accelerate the liquid to vapor transition. The hydrocarbon vapors, unless treated or captured, may ultimately discharge into the atmosphere. It is known that hydrocarbon vapors are discharged from the engine crankcase during engine operation. When the engine is shutdown, these vapors may continue to be released from the hot engine crankcase and other components, particularly as the engine cools.

The control of hydrocarbon vapors escaping into the environment is regulated by state and federal regulations. Hydrocarbon traps for capturing hydrocarbon vapors are well known. For example, motor vehicles are commonly equipped with hydrocarbon adsorptive emissions canisters connected to the fuel tank for trapping hydrocarbon vapors, particularly as emitted during refueling.

It is known that certain porous materials such as activated carbon are useful for absorption and removal of organic hydrocarbon vapors. It is known hydrocarbon vapors are liquefied within small micro pores of the activated carbon and may be retained by absorption.

It is known in the state of the art to produce a hydrocarbon adsorption (HCA) media, such as two adjacent sheets of air permeable media between which hydrocarbon adsorptive materials are arranged. It is known to arrange such HCA media in an air intake system of an internal combustion engine where it is operable to entrap hydrocarbon vapors.

As a general introduction to the art of injection molding-injection molding is a manufacturing process for producing parts by injecting thermoplastic, thermosetting polymers, plastic or resin materials into a mold tool. Common polymers like epoxy and phenolic are some examples of thermosetting plastics while nylon, polyethylene, and polystyrene are examples of thermoplastic materials.

Injection molding machines generally consist of a material hopper, an injection ram or screw-type plunger, and a heating unit. Also known as presses, they hold the molds in which the final components are shaped. Presses are typically rated by tonnage, which expresses the amount of clamping force that the machine can exert. This force keeps the mold closed during the injection process, which may involve high pressures in the plastic injection process to completely fill the mold cavity.

The mold may consist of two primary mold halves, the injection mold plate and the ejector mold plate. Plastic resin may enter the mold through a sprue or gate in the injection mold; the sprue bushing is to seal tightly against the nozzle of the injection barrel of the molding machine and to guide/direct molten plastic to flow from the barrel into the mold, also known as the mold cavity. The sprue bushing directs the molten plastic to the cavity through channels that are machined into the faces of the mold plates. These channels allow plastic to run along them. The channels may also be called runners. The molten plastic flows through the runners and into the cavity geometry to form the desired part.

Typically in the state of art, the material for the part is fed into a heated barrel, mixed, and forced into a mold cavity, where it cools and hardens to the configuration of the cavity, thereby forming the desired part or component. The mold with the cavity is often shaped and designed from metal, typically either steel or aluminum, and precision-machined to form the features of the part to be molded.

The mold closes enclosing the mold cavity therein. When parts are molded, typically pelletized raw material may be fed through a hopper into a heated barrel with a reciprocating screw. The material is forced at high pressure into the part forming mold cavity. Once the material within the mold cools so that the molded part is dimensionally stable, the mold opens and the molded dimensionally stable part may be removed from the mold and the process restarted.

SUMMARY OF THE INVENTION

An object of the invention is to provide a method and apparatus to accurately position one or more sheets (stacked sheets) of an air permeable media, such as a filtration media, within a mold tool and to provide a retractable media location enforcement means within the mold tool to locate the media and hold the location of the media at a desired location within the tool, as well as second media holding means operable to engage and continue to hold the media in the position within the mold after the retractable location enforcement means are retracted, and continue holding during the plastic resin encapsulation process.

According to the present inventive disclosure, an innovative injection molding process is advantageously utilized to manufacture filter elements or hydrocarbon adsorption traps, such as the exemplary types and configurations disclosed herein. Advantageously, the present inventive disclosure discloses method of positioning/fixing location and loosely stacking filter media sheets or HCA media sheets in a mold tool, wherein the tool includes locating components operable to fix the location of the media within the mold tool to a desired position during media loading into the tool, closing of the tool and subsequent injection molding. Advantageously, the present inventive disclosure teaches methods of locating and molding a frame around the periphery of the media sheets, holding the media sheets in the mold tools while automatically retracting media positioning/locating components before molding, and then molding the frame around the periphery media sheets to form the desired filter product or HCA trap as a single, one-piece, integrally molded component.

Advantageously in the invention, the present methods located the media within the mold and maintain the required position before and during frame molding, advantageously deleting other secondary steps practiced in the art including gluing the media and further producing a separate frame component and then assembling the frame to the glued media. As such, the specially modified injection molding process disclosed herein is advantageously utilized to manufacture filter elements or hydrocarbon adsorption traps in an automated, efficient, repeatable, reliable and low cost way, while eliminating additional steps of the prior art.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

FIG. 2 depicts a perspective view of hydrocarbon adsorption media sheets, skewed for easy visibility, cut to size for insertion into the molding tool and encapsulation into the support frame, consistent with the present invention and according to an exemplary embodiment discussed and illustrated herein for the understanding of the reader;

FIG. 3 depict a cross-section of a portion of a hydrocarbon adsorption media sheet, such as in FIG. 2, consistent with the present invention;

Figure 1:
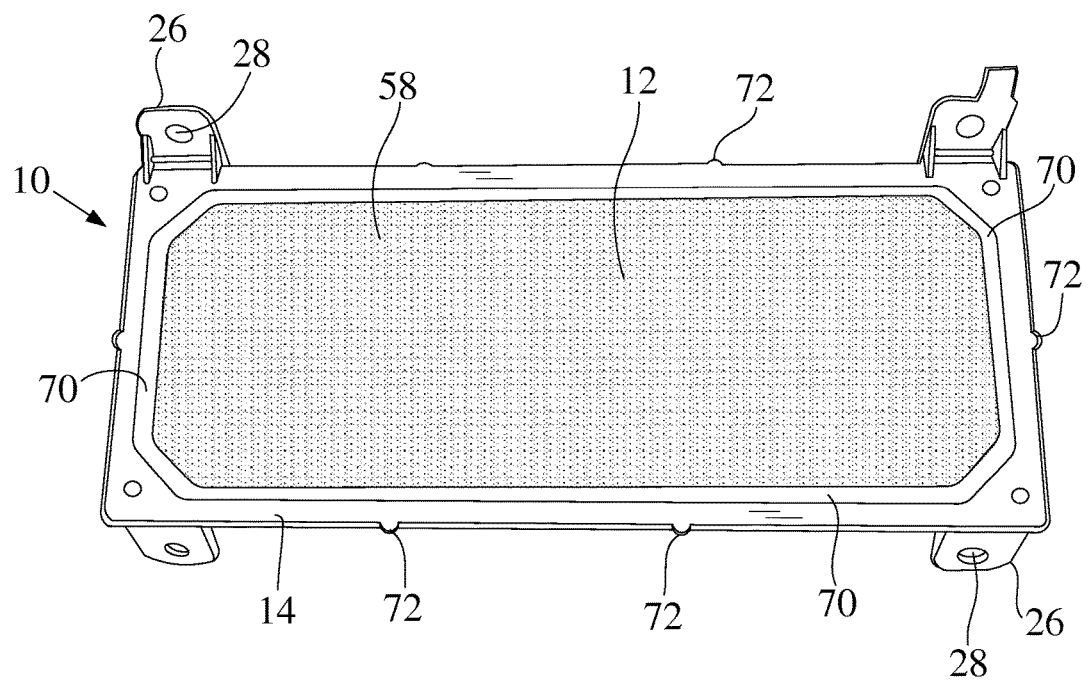
FIG. 1 depicts a perspective view of an encapsulated filter device of filtration media manufactured by the methods disclosed herein, for example, a hydrocarbon adsorption trap or for use as a filter device for filtering a fluid.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a filter apparatus. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

In one exemplary embodiment for enablement and illustration of the disclosed method of producing an encapsulated filter device of one or more sheet of air permeable filtration media, FIG. 3 depicts a portion of a hydrocarbon adsorption (HCA) media sheet 12 such as envisioned for use in the method disclosed herein to product a unitary over molded HCA trap. It is to be understood that the disclosed method is not limited to HCA media and production of HCA traps, but is instead also intended for production of filter elements or device, for example, air filter elements. Specifically the same methods may be used to produce plastic encapsulated flow-through filter devices adapted for filtration of gaseous or liquid fluids. For brevity, the present method and product characteristics are taught herein by example/illustration with reference to an preferred embodiment of an HCA trap.

In the exemplary embodiment of the HCA trap, the HCA media sheet 12 may include a first hydrocarbon vapor permeable media retention layer 16, a second hydrocarbon vapor permeable media retention layer 18 preferably positioned in a spaced parallel relationship to the first layer forming a gap 22 therebetween and a hydrocarbon vapor adsorbent media 20 disposed in the gap 22 between the first 16 and second 18 layers for adsorbing hydrocarbon laden vapors, for example evaporated fuel vapors from the intake tract when the engine is not operating.

In some embodiments of the HCA media sheet 12, the spaced media retention layers 16 and 18 may be secured together or closed/joined together along the periphery edge 74 of the media sheet 12 to seal the gap 22 at the layer edge portions 74 to retain the adsorbent media 20 between the layers 16 and 18, thereby preventing the hydrocarbon vapor adsorbent media 20 from escaping the gap 22 between the media retention layers 16 and 18.

In a preferred embodiment of the HCA media sheet 12, the edge portions of the spaced media retention layers 16 and 18 may be remain open, then relying upon the modified injection molding process of the present invention to seal the seal the edge portions of the spaced media retention layers 16 and 18 with the injection molded support frame 14, thereby preventing the hydrocarbon vapor adsorbent media 20 from escaping the gap 22 between the media retention layers 16 and 18.

In another preferred embodiment of the HCA media sheet 12, the edge portions of the spaced media retention layers 16 and 18 may be open with the hydrocarbon vapor adsorbent media 20 secured in the gap 22 between the media retention layers 16 and 18 with an adhesive material 24, thereby holding the hydrocarbon vapor adsorbent media 20 within the gap 22 at least until finally sealed within by the injection molded support frame 14 molded onto the peripheral edges of the HCA media sheet 12. The media retention layers with the adhesive bound hydrocarbon vapor adsorbent media may form a substantially rigid flat sheet, the substantially rigid sheet having sufficient rigidity to be self supporting, maintaining the sheet in a flat sheet form when supported only at the peripheral circumferential edges of the sheet.

The hydrocarbon adsorbent media 20 is preferably a hydrocarbon absorptive material, examples of which include activated carbon, zeolite, or other known hydrocarbon vapor absorptive materials.

In preferred aspects of the HCA media sheet 12, the hydrocarbon adsorbent media 20 includes activated carbon granules.

In preferred aspects of the HCA media sheet 12, the hydrocarbon adsorbent granules 20 may be bound together by an adhesive 24, the adhesive 24 maintaining the granules 20 in a desired spaced distribution between the spaced media retention layers 16 and 18 and optionally in a preferred shape or form (such as in a sheet form 12 of substantially uniform thickness (substantially uniform spacing between the spaced media retention layers 16 and 18).

The hydrocarbon vapor permeable layers (or air permeable layers) 16 and/or 18 may be realized as woven or non-woven synthetic fiber layers, for example polyester fiber layers. In some embodiments the air permeable layers 16 and/or 18 may be realized as synthetic nonwoven fiber sheets. Nonwoven fabrics may be manufactured, in multiple forms, from many grades of cellulose and most natural and synthetic fibers. Fibers used may include polyester, polypropylene, glass, acrylics, rayon, nylon, cotton, fluoropolymers and a host of others fiber materials select due to their special material compatibility for particular applications, such as selection for heat, hydrocarbon and fuel vapor exposure compatibility.

As shown in FIG. 2, embodiments of the over molded filter media product or a HCA trap 10 may include multiple stacked and overlaid filter media sheets 12 (or for example, HCA media sheets), such as the flat substantially rigid HCA media sheets 12 in FIGS. 1 and 2. The media sheets 12 are air permeable and may be fuel vapor permeable and therefore permit (in the case of a HCA trap) parallel stacking of the media sheets 12 onto each other to provide a desired hydrocarbon adsorption capacity for the HCA trap 10. The parallel stacked media sheets 12 are illustrated in FIG. 2 as skewed spatially only to better illustrate the stacking of preferably identically shaped and sized HCA media sheets 12, the stacking of sheets to form an HCA trap of sufficient hydrocarbon adsorption capacity. Although preferred for molding, the media sheets 12 are not required to be identically shaped or sized and may differ in length, width or shape. The media sheets 12 have peripheral circumferential edges 74 which will be encapsulated into the mold plastic peripheral support frame 14 according to the present invention.

Showing the process by example, FIG. 1 shows one embodiment of a filtration device 10, for one example the exemplary molded hydrocarbon adsorption trap (HCA trap) 10 manufactured by the process described herein. In the embodiment illustrated, the HCA trap includes one or more hydrocarbon adsorption media sheets 12 (see FIG. 2) which may be aligned and stacked directly one on top of the other in a mold tool, and then encapsulated along the periphery of the media sheets 12, embedding the media sheets 12 into a peripheral support frame 14. In some embodiments, the formed peripheral support frame 14 is substantially rigid so as to be self-supporting and providing support to the hydrocarbon adsorption media sheets 12 while in use, say, for example, within an air intake tract of an internal combustion engine. In other embodiments, the peripheral support frame 14 may be flexible, such as made of a deflectable, possibly stretchable elastomeric material, the flexibility permitting the support frame to bend and conform to the available interior space and configuration of a housing in which the support frame is to be mounted. The peripheral support frame may have one or more radial projection portions 72 of plastic material filled into the space left by the retracting media position holding pins 34 when the retract into the mold. The compressed media region 70 is the region compressed by the media fixation walls 56, discussed later.

The peripheral support frame 14 provides support to the filter media sheet(s) or (for example) hydrocarbon adsorption media sheets 12, at least along the peripheral edges of the sheets, to mount the hydrocarbon adsorption media sheet or sheets 12 onto, for example, an insides surface of an air duct, or an air intake tract, or into the interior of a filter housing, although the hydrocarbon adsorption trap according to this disclosure may be installed to other components or used in other applications.

In the exemplary embodiment illustrated in FIG. 1, the media sheets 12 are substantially flat/planar and permanently embedded at their periphery by injection molding into the peripheral support frame 14. The peripheral support frame 14, as in FIG. 1, may have one or more mounting tabs 26 formed with the frame 14 during the molding and projecting outwardly away from the support frame 14. One or more of the tabs 14 may include through holes, such as mounting holes 28, configured to receive fasteners (not shown) or other fastening means (for example, heat stakes) to enable mounting of the support frame to another component.

Figure 4A:
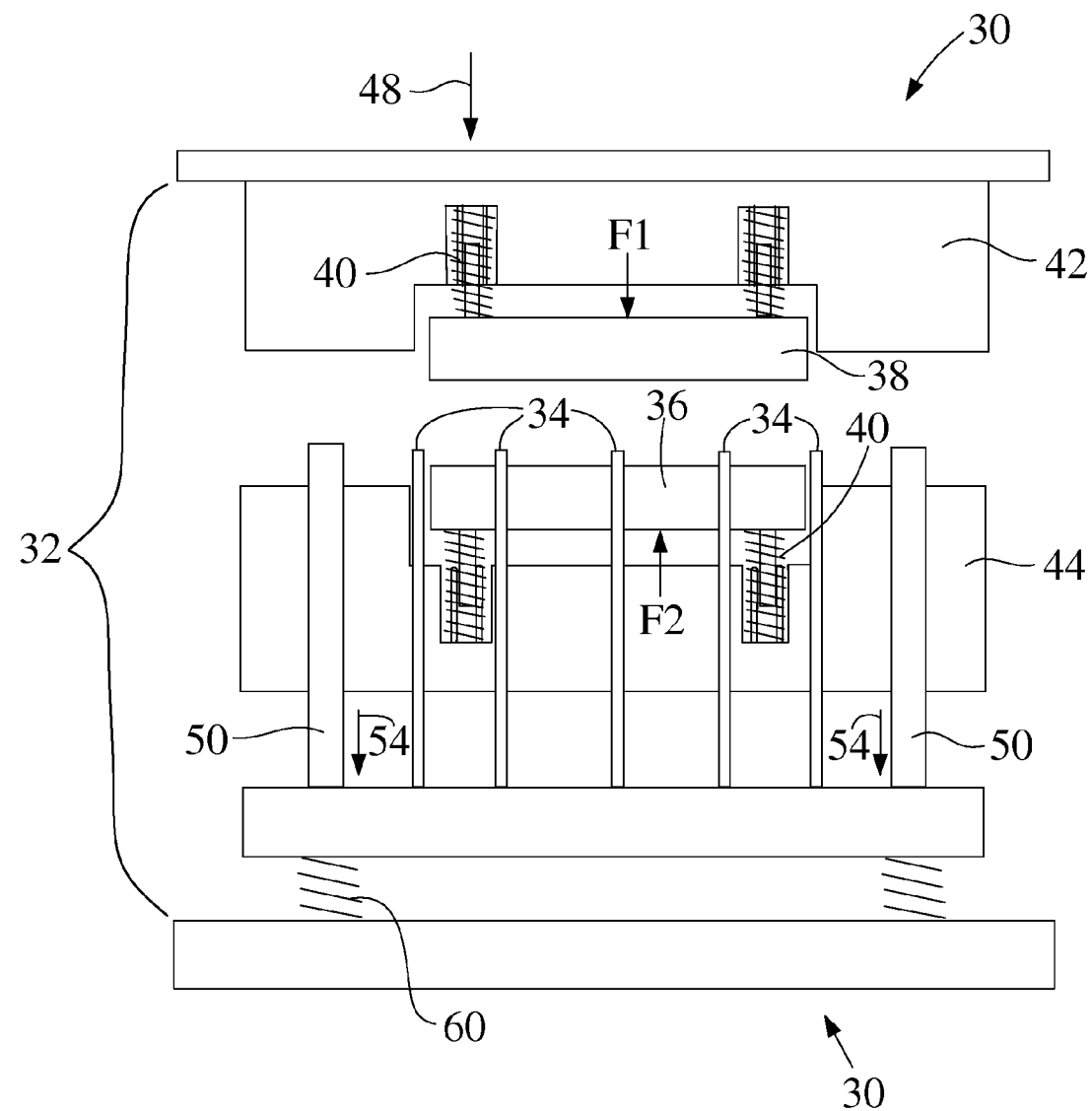
FIG. 4A depicts a schematic side view of press and tool in the open position, including the mold halves and additional components to realize the innovative method of manufacturing an encapsulated filter device or a hydrocarbon adsorption trap, consistent with the present invention.
Figure 4B:
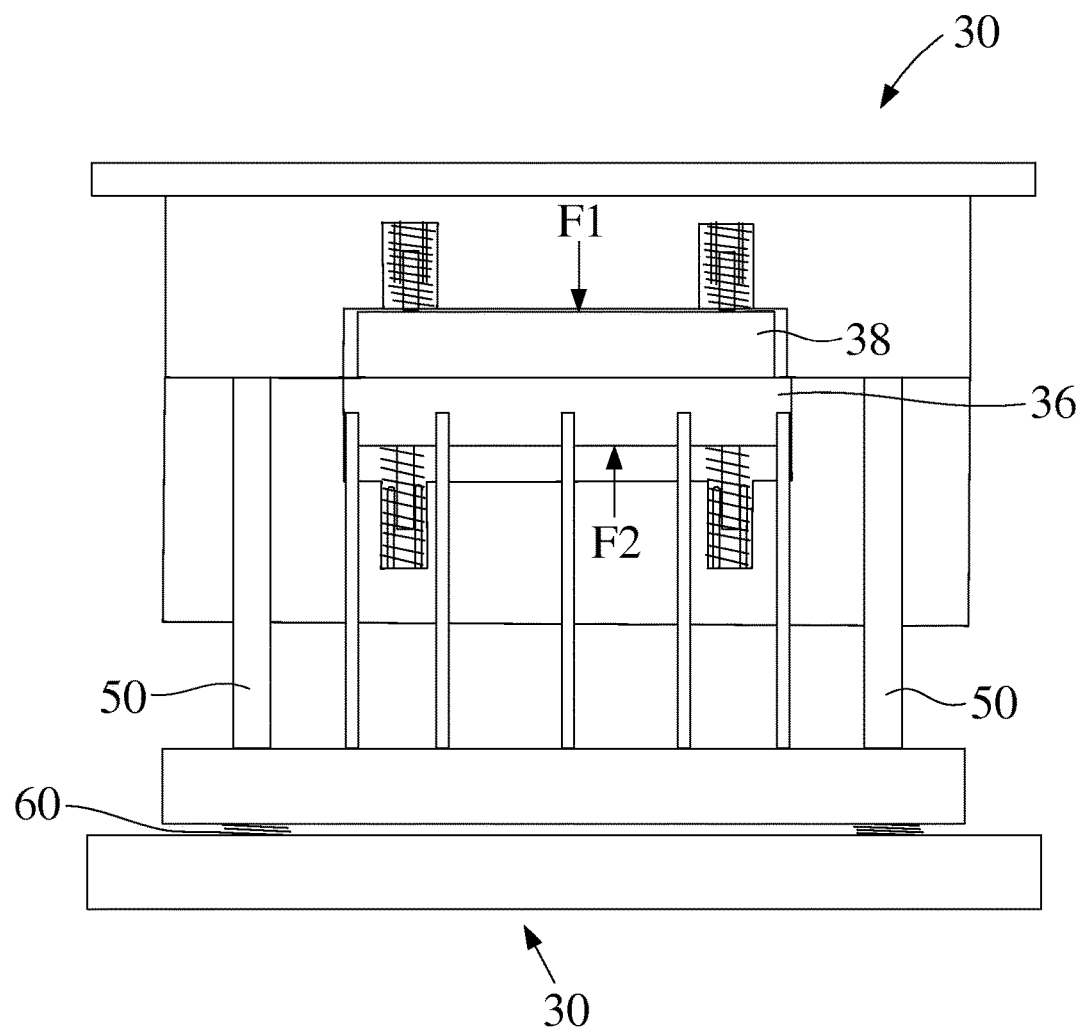
FIG. 4B depicts a schematic side view of press and tool in the closed open position, consistent with the present invention.
Figure 5:
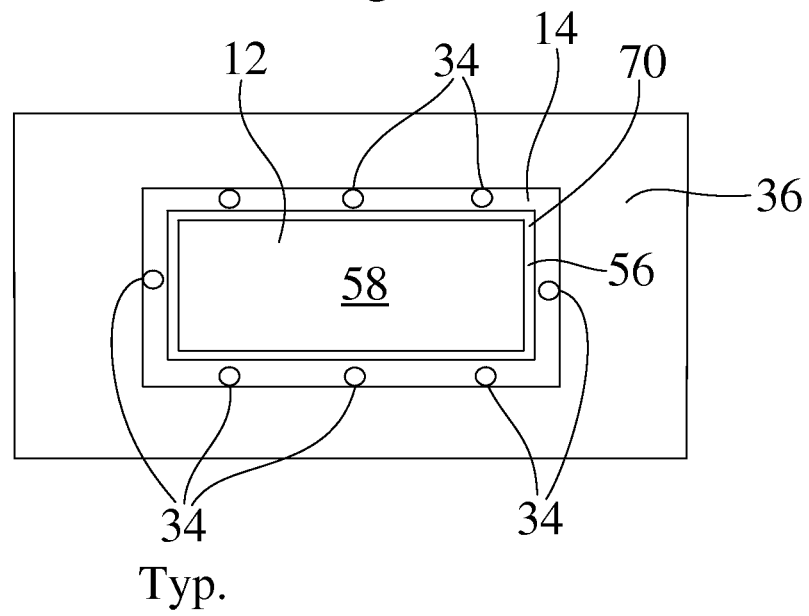
FIG. 5 depicts a schematic top view of a mold plate showing the media sheet(s) held in position along their circumferential edges by contact with temporarily raised position holding pins, consistent with the present invention.

FIG. 4A depicts a schematic side view of press 30 in the open position with the tool including the mold tool halves 36 and 38 and additional components to realize the innovative method of manufacturing a hydrocarbon adsorption trap, as disclosed herein. FIG. 4B depicts a schematic side view of press 30 in the nearly closed position. As the press 30 moves to close, the media sheets 12 are eventually compressed and held in position by the media fixation walls 56, discussed later. The mold tool halves 36 and 38 are preferably made of metals such as suitable varieties of steel, hardened or tool steel, or aluminum.

Figure 6:
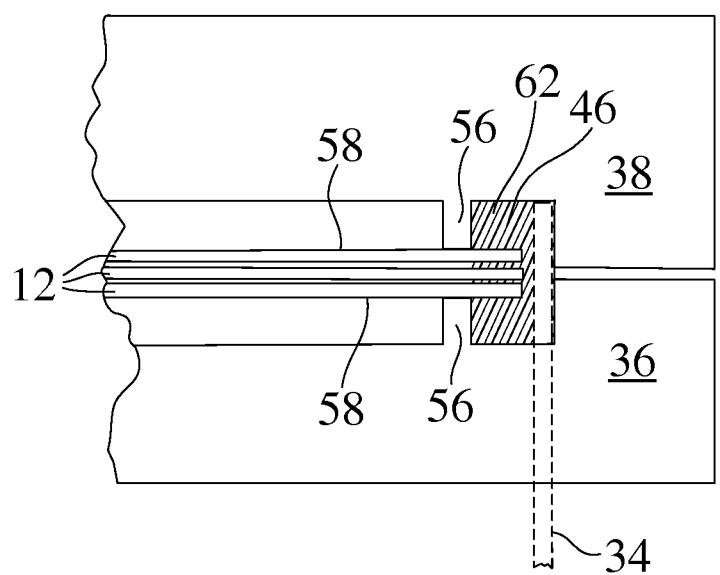
FIG. 6. depicts a schematic cross section of upper and lower mold tool plates in a closed position, holding the media sheets in place with the temporarily raised position holding pins retracted, consistent with the present invention.

In FIG. 4A the press 30 is shown in an open position. For injection molding, the upper press portion 42 moves in direction 48 to a closed position (FIG. 4B), the upper press portion 42 closing onto and compresses against the lower press portion 44 to close the mold cavity 46 (see FIGS. 6 and 7) therebetween prior to injection of thermoplastics or resins into the mold cavity 46 for forming the peripheral support frame 14 and embedding the hydrocarbon adsorption sheets into the peripheral support frame 14. Advantageously and according to the invention, either one or both of the mold tool halves 36 and 38 may include tool compression springs 40 (schematically shown) operable to transmit compressive forces F1, F2 from the press 30 onto the mold tool halves 36 and 38 to hold the mold tool halves 36 and 38 fully compressively closed against and onto each other during the high pressure injection molding process and to compensate for possible alignment differences, while also compressively holding the media in position with the first alignment means are retracted.

Figure 7:
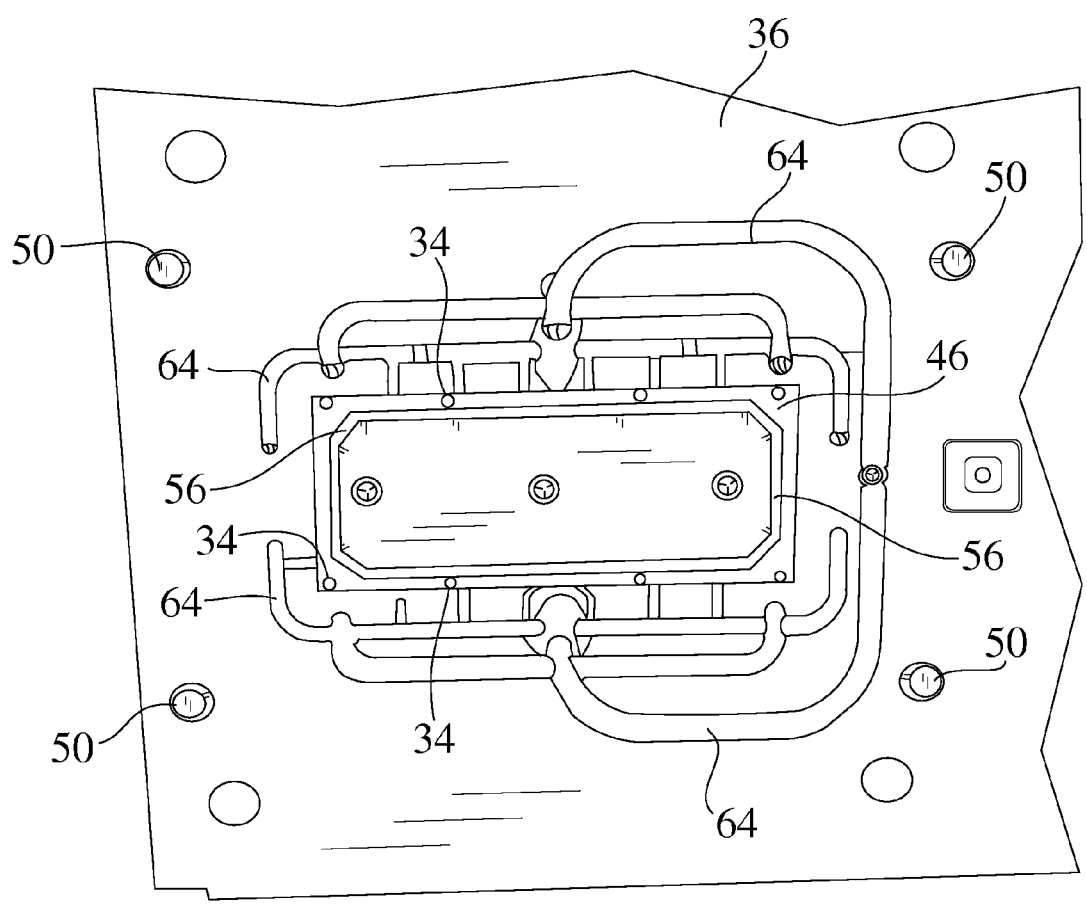
FIG. 7. is a top view of a first mold plate (mold tool half) showing the position holding pins spaced radially outwardly from the raised compression rim of the media fixation wall, and channels (or runners) through which resin or moldable material is delivered into the mold cavity, consistent with the present invention.

As schematically shown in FIG. 4A and best shown for position in FIG. 7, the mold tool 32 may preferably includes a plurality of retracting media position holding pins 34 arranged radially outwardly of the stacked media sheets 12 and arranged to contact against the peripheral circumferential edges of the media sheets 12, thereby temporarily fixing the position of the media sheets 12 within the first mold tool half 36, at least until the mold tool halves 36 and 38 close against each other to take up and maintain the media sheet positioning.

One or more pusher members 50 may be provided extending slideably through the lower press portion 44 and operable to move the positioning pin retraction member 52 to retract the media position holding pins 34 when the mold tool halves 36 and 38 close (see FIG. 4B) and prior to injection of thermoplastic or resin material. As best shown in FIG. 7, the media position holding pins 34, when extended, may extend into the interior of the mold cavity 46, the cavity 46 which defines the form of the peripheral support frame 14 of the filtration device or HCA trap 10. When the media position holding pins 34 retract (FIG. 4B), the injection molding process fills the space in the cavity previously occupied by the media position holding pins 34 with plastic material, the now filled space forming part of the peripheral support frame 14.

The pusher members 50 may be urged to move in a downward direction 54 (direction according to arrow 54 in FIG. 4A), this by the pusher members 50 contacting against the upper press portion 42 or the second mold tool half 38 as the press 30 moves to the closed position (see FIG. 4B).

Movement of the pusher members 50 in the downward direction 54 urges the positioning pin retraction member 52 in a downwards direction 54, thereby urging the media position holding pins 36 to retract away from the media sheets 12 and to retract substantially from the interior of the mold cavity 46 (see FIG. 4B). The downward movement of the pusher members 50 may act against one or more return springs, and may compress the return springs, so that when the press 30 opens (FIG. 4A) the media position holding pins 34 are extending into the mold cavity 46 in preparation for receiving and hold an new set of filter media sheet(s) 12 in another product molding cycle.

According to the invention it is preferred that the first mold tool half 36 and the second mold tool half 38 include complimentary media fixation walls 56, having complimentary shape and axial alignment and projecting axially from the old tool halves to engage directly and in an aligned fashion against opposing sides of the filter media or HCA media sheet 12, thereby to compress the media sheets 12 together. One or both of the first 36 and second 38 mold halves may be realized as mold inserts, moveably mounted and located by tool compression springs 40, the tool compression springs 40 compressively loading and urging the first 36 and second 38 mold halves together, the spring loading maintaining a sufficient compressive force on the media fixation walls 56 holding the media sheet(s) 12 in the desired position in the mold so the retracting media position holding pins 34 can retracted without losing the media positioning in the mold. The media fixation walls 56 may also serve as injection resin boundary walls closing the radial inward side of the mold cavity 46 from the open faces 58, thereby preventing resin in the mold cavity from reaching and contaminating the open faces 58 of the media sheet(s).

According to the invention it is preferable that the media position holding pins 36 are not fully retracted away from the media sheets 12 until the media fixation walls 56 contact and begin to compress the media sheets 12 together, the compression thereby holding the media sheets 12 in the desired position in the mold tool so the media position holding pins 36 are no longer required and may be safely retracted.

The media fixation walls 56 may compress the media sheets 12 with substantial force, a sufficient force of the media fixation walls 56 pressing sealably against the opposing sides of the media to thereby close the radial inner side of the mold cavity preventing the to be injected plastic resin material forming the peripheral support frame 12 from migrating into or onto the open central portion of the encapsulated filtration product or alternately the HCA trap 10, so that the open faces 58 of the media sheet(s) 12 remain open and unobstructed by the injected plastic resin after the injection molding operation.

FIG. 7 shows one exemplary embodiment of the first mold tool 36 with the media position holding pins 34 extending into the mold cavity 46 and the media fixation walls 56 separating the mold cavity 46 from the open interior where the open faces 58 of the media sheet 12 will be received and positioned.

The first mold half 36 and/or the second mold half 38 may including channels 64 machined into the faces of the first mold half 36 and/or the second mold half 38, the channels conducting injected plastic resin into the mold cavity 46.

Figure 8:
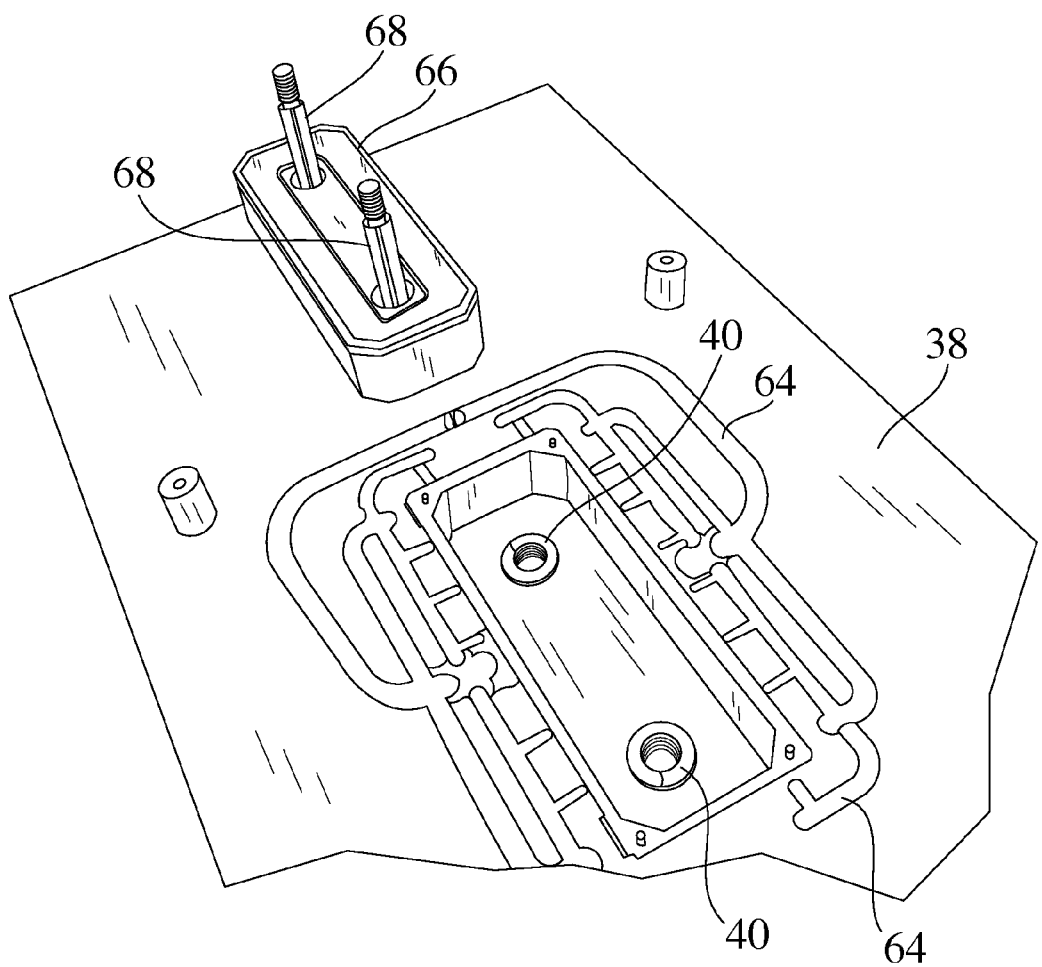
FIG. 8. is a top view of a mating second mold plate (mold tool half) showing channels through which resin or moldable material is delivered to the cavity, and springs compressively loading the inner mold tool portion, consistent with the present invention.

FIG. 8 shows on exemplary embodiment of a second mold plate (second mold half 38) showing channels 64 through which resin 62 or moldable material is delivered to the mold cavity 46, and tool compression springs 40 compressively loading the inner mold tool portion 66 of the second mold half 38. The inner mold tool portion 66 is shown removed from and sitting upside down on the mold plate to expose the guide pins 68 of the inner mold tool portion 66. The guide pins 68 may be received into the interior of the tool compression springs 40 to axially guide the inner mold tool portion 66.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A method of fixing position of and holding one or more filtration media sheets within a mold to allow encapsulation of the sheets with a plastic resin, the method comprising:
   providing the at least one filtration media sheet to be overmolded;
   providing a mold tool having a first and a second half, the mold halves defining a mold cavity for forming a support frame by injection molding;
   providing at least one retracting position hold pin slidably arranged in the mold tool and extendable into or next to the mold tool cavity, the retracting position hold pin retractable away from the mold tool cavity, the at least one retracting position hold pin arranged to engage a circumferential periphery of the at least one filtration media sheet so as to fix the position of the at least one filtration media sheet within the mold tool;
   opening the mold tool;
   if not extended, extending the at least one retracting position hold pin to enforce location of the at least one filtration media sheet within the mold;
   placing the at least one filtration media sheet within the open mold tool and in proximate contacting position to the extended at least one retracting position hold pin;
   beginning to close the mold tool by moving the mold tool halves to a nearly closed position;
   compressing a portion of the at least one filtration media sheet between the closing mold tool halves, the compressing step holding the at least one filtration media sheet in position within the mold tool;
   retracting the at least one retracting position hold pin away from the at least one flexible product or product sheets while the compressing step continues to hold the at least one filtration media sheet in position within the mold tool;
   bringing the mold tool to a fully closed position for injection molding;
   injection molding a plastic resin into the mold cavity while the compressing step continues to hold the at least one filtration media sheet in position within the mold tool;
   encapsulating a portion of the at least one filtration media sheet in the plastic resin; and
   ending the compression step, opening the mold tool and removing the encapsulated product from the mold tool;
   wherein in the step of providing a mold tool, the first and second mold tool halves include axially extending complimentary media fixation walls;
   wherein in the step of bringing the mold tool to a fully closed position, the media fixation walls contact and compress opposing faces of the at least one filtration media sheet;
   wherein in the step of injection molding a plastic resin, the media fixation wall forms a radially inner wall of the mold cavity, preventing the injected plastic resin from reaching the open faces of the at least one filtration media sheet;
   wherein at least one of the first mold half and the second mold half is a mold insert axially moveable within the press;
   wherein the mold insert is loaded by tool compression springs to provide a compressive force to generate a compressive force to press the media fixation walls of the first and the second mold tool halves together such that the media fixation walls compressively engage against the opposing faces of the at least one filtration media sheet.

2. The method according to claim 1, wherein
   in the step of providing filtration media sheet, the at least one filtration media sheet is at least one hydrocarbon adsorption media sheet.

3. The method according to claim 2, wherein
   wherein the at least one hydrocarbon adsorption media sheet is a plurality of stacked hydrocarbon adsorption media sheets;
   wherein the support frame circumferentially surrounds the at least one hydrocarbon adsorption media sheets on its circumferential edges;
   wherein the encapsulating step includes securing the at least one hydrocarbon adsorption media sheets together along their circumferential edges and embedding the circumferential edges into the support frame.

4. A method of locating and holding position of an air permeable media within a mold and encapsulation of the media with a plastic resin, the method comprising:
   providing at least one sheet of air permeable media to be encapsulated;
   providing a mold tool having a first mold tool half, a mating second mold tool half and having a mold cavity for forming a support frame by injection molding;
   providing at least one retracting position hold pin slidably arranged in the first mold tool half and extendable into or next to the mold tool cavity, the retracting position hold pin retractable away from the mold tool cavity, the at least one retracting position hold pin arranged to engage a circumferential periphery of the at least one air permeable media sheet so as to fix the position of the at least one air permeable media sheet within the mold tool;
   opening the mold tool by separating the mold tool halves;
   if not extended, extending the at least one retracting position hold pin;
   placing the at least one sheet of air permeable media or at least one filtration media sheet of air permeable media into the first mold tool half of the open mold tool and in proximate contacting position to the extended at least one retracting position hold pin;
   beginning to close the mold tool by moving the mold tool halves to a nearly closed position;

compressing a portion of the at least one sheet of air permeable media or stacked sheets of air permeable media between the closing mold tool halves, the compressing step holding the at least one sheet of air permeable media or stacked sheets of air permeable media in position relative to and within the mold tool;

retracting the at least one retracting position hold pin away from the at least one flexible product or product sheets while the compressing step continues to hold the at least one sheet of air permeable media or stacked sheets of air permeable media in position within the mold tool;

bringing the mold tool to a fully closed position for injection molding;

injection molding a plastic resin into the mold cavity to form a peripheral support frame while the compressing step continues to hold the at least one sheet of air permeable media or stacked sheets of air permeable media within the mold tool;

circumferentially encapsulating the periphery of the at least one sheet of air permeable media or stacked sheets of air permeable media into the plastic resin, forming a one-piece unitary product;

ending the compression step, opening the mold tool and removing the encapsulated product from the mold tool;

wherein in the step of providing a mold tool ,the first and second mold tool halves include axially extending complimentary media fixation walls;

wherein in the step of bringing the mold tool to a fully closed position, the media fixation walls contact and compress opposing faces of the at least one sheet of air permeable media;

wherein in the step of injection molding a plastic resin, the media fixation wall forms a radially inner wall of the mold cavity, preventing the injected plastic resin from reaching the open faces of the at least one sheet of air permeable media;

wherein at least one of the first mold half and the second mold half is a mold insert axially moveable within the press;

wherein the mold insert is loaded by tool compression springs to provide a compressive force to generate a compressive force to press the media fixation walls of the first and the second mold tool halves together such that the media fixation walls compressively engage against the opposing faces of the media.

5. The method according to claim 4, wherein
in the step of providing at least one sheet, the air permeable media is a hydrocarbon adsorption media having hydrocarbon adsorption granules sandwiched between two spaced media retention layers;

wherein the hydrocarbon adsorption granules are adhesively bound together such that the at least one sheet is flat and substantially rigid so as to be self-supporting.

6. The method according to claim 4, wherein
the at least one sheet of air permeable media is a hydrocarbon vapor permeable media sheet having
a first media retention layer;
a second media retention layer positioned in spaced parallel relationship to the first media retention layer, forming a gap therebetween;
a hydrocarbon vapor adsorbent media disposed in the gap between the first and second media retention layers;

wherein in the step of circumferentially encapsulating, the gap is sealed at edge portions of the hydrocarbon vapor permeable media sheet by embedding the edge portions into the molded support frame.

7. The method according to claim 4, wherein
in the step of providing at least one retracting position hold pin, the at least one retracting position hold pin are a plurality of position holding pins arranged radially outwardly of and spaced around a circumference of the at least one sheet of air permeable media on the first mold half;

wherein in the step of beginning to close the mold tool, a set of pusher members are actuated by the closing movement of the second mold tool half towards the first mold tool half, the pusher members retracting the plurality of position holding pins.

* * * * *